United States Patent [19]

Buchberger et al.

[11] Patent Number: 5,111,736

[45] Date of Patent: May 12, 1992

[54] VENTED STATIC SEAL ASSEMBLY

[76] Inventors: Anton H. Buchberger, 16713 - 127th Ave. SE., Renton, Wash. 98058; Olivier L. Tremoulet, Jr., 18334 Andover St., Edmonds, Wash. 98020; Sigurd C. Mordre, P.O. Box 5087, Vashon Island, Wash. 98070

[21] Appl. No.: 455,579

[22] Filed: Dec. 20, 1989

Related U.S. Application Data

[63] Continuation-in-part of Ser. No. 333,343, Apr. 4, 1989, abandoned, and Ser. No. 333,342, Apr. 4, 1989.

[51] Int. Cl.$^5$ ............................................. F15J 15/18
[52] U.S. Cl. ........................................ 92/168; 277/27; 277/188 R
[58] Field of Search ............................ 92/167, 168 R; 277/188 A, 188 R, 27, 71, 75; 417/571, 569, 401, 489

[56] References Cited

U.S. PATENT DOCUMENTS

| | | | |
|---|---|---|---|
| 2,614,793 | 10/1952 | Storm | 277/177 X |
| 2,628,139 | 2/1953 | Gilliland | 92/168 |
| 2,914,368 | 11/1959 | Farmer et al. | 92/184 |
| 3,007,723 | 11/1961 | Clarke | 92/168 |
| 3,023,014 | 2/1962 | Donner | 277/173 |
| 3,338,136 | 8/1967 | Jerome et al. | 92/168 |
| 4,211,151 | 7/1980 | Wallischeck | 92/165 R X |
| 4,312,264 | 1/1982 | Nunnemacher et al. | 92/171.1 X |
| 4,384,511 | 5/1983 | Mefferd | 92/168 X |
| 4,594,938 | 6/1986 | Shore | 92/168 X |
| 4,703,937 | 11/1987 | Chrzanowski | 277/177 X |

Primary Examiner—Edward K. Look
Assistant Examiner—John Ryznic
Attorney, Agent, or Firm—Hughes & Multer

[57] ABSTRACT

A seal assembly for a high pressure pump where there is an O-ring positioned in a seal groove having side seal surfaces and a back seal surface, with said O-ring being exposed alternately to high and low pressures in the pumping chamber. A pressure relief passageway is provided to the O-ring at a side surface portion thereof to provide pressure relief at the back side of the O-ring and thus alleviate unwanted fluid accumulation behind the O-ring, thus extending the longevity of the O-ring.

17 Claims, 5 Drawing Sheets

VENTED STATIC SEAL ASSEMBLY

The present application is a continuation-in-part of patent applications Ser. No. 07/333,343, filed Apr. 4, 1989, entitled "Vented Static Seal Assembly" (now abandoned) and Ser. No. 07/333,342, filed Apr. 4, 1989, entitled "High Pressure Dynamic Seal".

BACKGROUND OF THE INVENTION

1. Field of the Invention

The present invention relates to a high pressure seal which is subjected to substantial variations in fluid pressure against the high pressure side of the seal, and more particularly to such a seal which is adapted for use in a high pressure fluid pump.

2. Background Art

There are various applications for high pressure pumps, one being to supply very high pressure fluid, (e.g. water at a pressure of 10,000 psi to 100,000 psi or possibly more) so that this water may be discharged in the form of a high velocity water jet which can be used for cutting, abrading, etc. A common configuration for such a pump is to employ a piston which reciprocates in a high pressure cylinder to direct the fluid (generally water) to a manifold from which the water is guided (plumbed) to a nozzle and then discharged as the high pressure jet. On the pressure stroke, the plunger or piston can generate pressures in excess of 25,000 psi, while during the intake stroke the pressure in the cylinder chamber is substantially zero or very low.

There are a number of critical problems associated in the design and operation of such a high pressure fluid pump assembly. One of these problems is providing adequate seals, particularly in those areas where the seal is exposed to greatly fluctuating pressures. To provide an effective seal assembly in this environment, generally several seal components are used in combination. It is quite common to use an elastomeric ring member (commonly called an O-ring) as part of such seal assemblies. Quite often such O-rings are placed in a groove of another member so as to be exposed to the high fluid pressures, with the O-ring deforming under the high pressures to cooperate in providing the overall seal. However, it has been found that even in those areas where there is a so-called "static seal," quite often these O-rings are subject to early deterioration, this resulting in frequent shutdown of the equipment for repair or replacement of the seal assembly or its components.

A search of the prior art has disclosed a number of patents, these being the following:

U.S. Pat. No. 2,914,368 (Farmer, et al) relates to a seal for a piston-cylinder fluid motor. Two O-rings are mounted at opposite ends of the piston, and this system is such that fluid can be introduced under pressure on either side of the piston to move the piston toward one side or the other. There are two O-rings 46 and 47, and these are positioned in circumferential grooves at the axial ends of the piston, so as to form sliding seals with the inner surface of the cylinder. There are two passageways 48 and 49 which lead from the respective chambers of the cylinder (on opposite sides of the piston) and into a radially inward bottom wall of a groove for the related O-ring 46 or 47. The problem toward which this patent is directed is to alleviate the tendency of the O-rings to roll during operation, and thus produce a pumping action during cycling of the motor, so that a buildup of pressure occurs in the area between the O-rings. With reference to FIG. 3 of that patent, it can be seen that there are two passageways 48 and 49 which lead from respective chambers in the cylinder (on opposite sides of the piston) and into a radially inward bottom wall for the grooves for the O-rings 46 and 37. The operation is such (see FIG. 3 of that patent) so that when the piston moves to the right the pressure enters the passageway 48 to help push the O-ring 46 against the backup ring 41 to form a seal. However, on the low pressure side of the piston, there occurs the problem of the rolling of the O-ring to cause fluid pressure between the O-rings 46 and 47. On the low pressure side, the passageway 49 acts as a pressure relief passageway to permit the escape of the fluid to alleviate this pressure buildup. Thus, the problem toward which this patent is directed is that of alleviating a pressure buildup due to the rolling action of the O-ring where the O-ring is in engagement with the moving surface of a dynamic seal, such as a cylinder surface with the O-ring being part of a reciprocating piston.

U.S. Pat. No. 3,685,840 (Henry) relates to a seal arrangement for a high pressure pump where there is a reciprocating piston. There are two sets of seal members 46–48 and 36–38. The patent is directed toward a means of inserting lubricating fluid from a passageway 24 into accurate grooves 62 and 68. On the pressure stroke, there is sufficient pressure in the recesses 52, 58 and 42 so as to press the lip 44 into sealing engagement against the surface 18 and also pressure the lips 54 and 60 against one another, thus crating a seal. However, on the intake stroke, the pressure of the lubricating fluid in the passageway 24 is sufficient to cause these lips 54 and 60 to part, and also to cause the lip 44 to move away, thus permitting lubricating fluid to enter into the area of the seal 36–38 and 46–48.

U.S. Pat. No. 3,132,568 (Strader) shows a seal for a high pressure piston where there is a wiper ring 52 exposed to the pressurizing fluid, the purpose of this wiper ring 52 being to prevent foreign material from coming into the area of the seal element so as to cause wear of these. There are three seal rings, 61, 62 and 63, each having a "v" shaped cross-section. There is provided a passageway 65–55 which leads into a radial passageway 67, each passageway being formed in an adapter 43. These passageways provide direct fluid pressure against the packing ring 61–63 so as to improve their sealing capability. In addition, this provides fluid pressure on both sides of the wiper ring 52 which is alleged to improve the wiping action to prevent foreign matter from coming into contact with the packing rings 61–63, a screen 48 is provided at the entrance of the passageway 66.

U.S. Pat. No. 4,478,423 (Hjelsand, et al) shows a high pressure seal for use in conjunction with a reciprocating plunger which is used to pump fluids such as cement slurries, fracturing slurries, acids and the like under pressure into an oil well. A prior art seal is shown in FIG. 1, and there is a brass header ring adapter 64 behind which is an elastomeric header ring 26 constructed of rubber having a hardness of 70 to 80 durometer, behind which are packing rings 42 and 44 that have in cross-section a "V" shape. There is a female adapter ring 50 made of brass and a "V" shaped anti-extrusion adapter ring 52 disposed between the last "V" shaped packing ring and the female adapter 50. The improvement which is the substance of this patent is shown in FIG. 2, and this comprises a wiper seal 100 having a "T" shaped in cross-section and having openings around the periphery of this seal ring. This permits a passage of a certain amount of fluid between the piston and this seal 100 because the seal 100 deforms into the apertures 216. This occurs in the event that some of the liquid being pumped escapes past the main seal made up of the components 26, 42, 44, 52 and 60.

U.S. Pat. No. 2,723,268 (Duval) shows a seal arrangement, for an hydraulic piston where there is a triangularly shaped seal (i.e. a cross-sectional triangular shape) where the apex of the triangle bears against the piston wall. There is a passageway connecting to the radially inward surface of the seal ring, and this is directed toward the high pressure side of the piston. This causes pressurization of the radially inward wall of the ring to press it outwardly against the cylinder, thus creating a better seal. An opposite arrangement is shown in FIG. 2 of that patent.

U.S. Pat. No. 1,618,611 (Burstall) shows a seal arrangement for a reciprocating piston where in one configuration the seal has a radially inward face which is exposed to high pressure by means of a passageway. This causes the seal ring to expand outwardly to engage the cylinder wall more closely and thus provide a more effective seal. It appears that this can also be done in a reverse manner so that the pressure is applied on the outside of the seal ring to cause it to squeeze inwardly against the cylinder member which then moves relative to the seal.

SUMMARY OF THE INVENTION

The present invention comprises a high pressure seal assembly where there is a structural assembly having a high pressure side which is exposed alternately to high and low pressures in a high pressure area, and having two opposite groove defining side surfaces and a groove defining back surface, with these three surfaces collectively defining a seal groove. Also, the structural assembly has adjacent surfaces which extend from an area of said back surface and for which a seal is to be provided.

There is a resilient seal member which is configured to fit in the groove and which has a high pressure surface portion facing the high pressure area, two side surface portions adapted to come into sealing engagement with the side surfaces of the structural assembly, and a back surface portion adapted to be positioned adjacent to the back surface of the structural assembly.

The seal member and the structural assembly are arranged so that under a high pressure condition in the high pressure area, the seal member is pressed into a high pressure sealing position where the side surface portions of the seal member press against side sealing surface portions of the side surfaces of the structural assembly in a side sealing area, and where the back surface portion of the seal member is adjacent to the groove defining back surface at a back seal area.

The present invention is predicated, at least in part, in the discovery that the performance and longevity of the seal member can be greatly improved by providing relief passageway means leading from the side sealing area at a location spaced from the back sealing area and extending through the structural assembly to a lower pressure area. It can be hypothesized with reasonable justification that during periods of high pressure in the high pressure area, there is some buildup of pressurized fluid in the back seal area. It can further be hypothesized that during the lower pressure periods in the high pressure area, this back pressure tends to displace the seal from its proper seated location, and that if this occurs during repeated cycles, the displacement can be sufficient eventually to cause the damage to the seal member, or otherwise prevent it from performing its proper function. It is believed that the provision of the relief passageway means provides an avenue by which the pressurized fluid in the back seal area is able to pass from behind the seal member so as to enable the seal member to remain properly seated in the seal groove. However, it is to be understood that regardless of the correctness of the above hypothesis, the arrangement of the seal assembly as described herein has provided substantial improvement in the operation and longevity of the seal member of the seal assembly.

Other features of the present invention will become apparent from the following detailed description.

DESCRIPTION OF THE PREFERRED EMBODIMENTS

Figure 1:
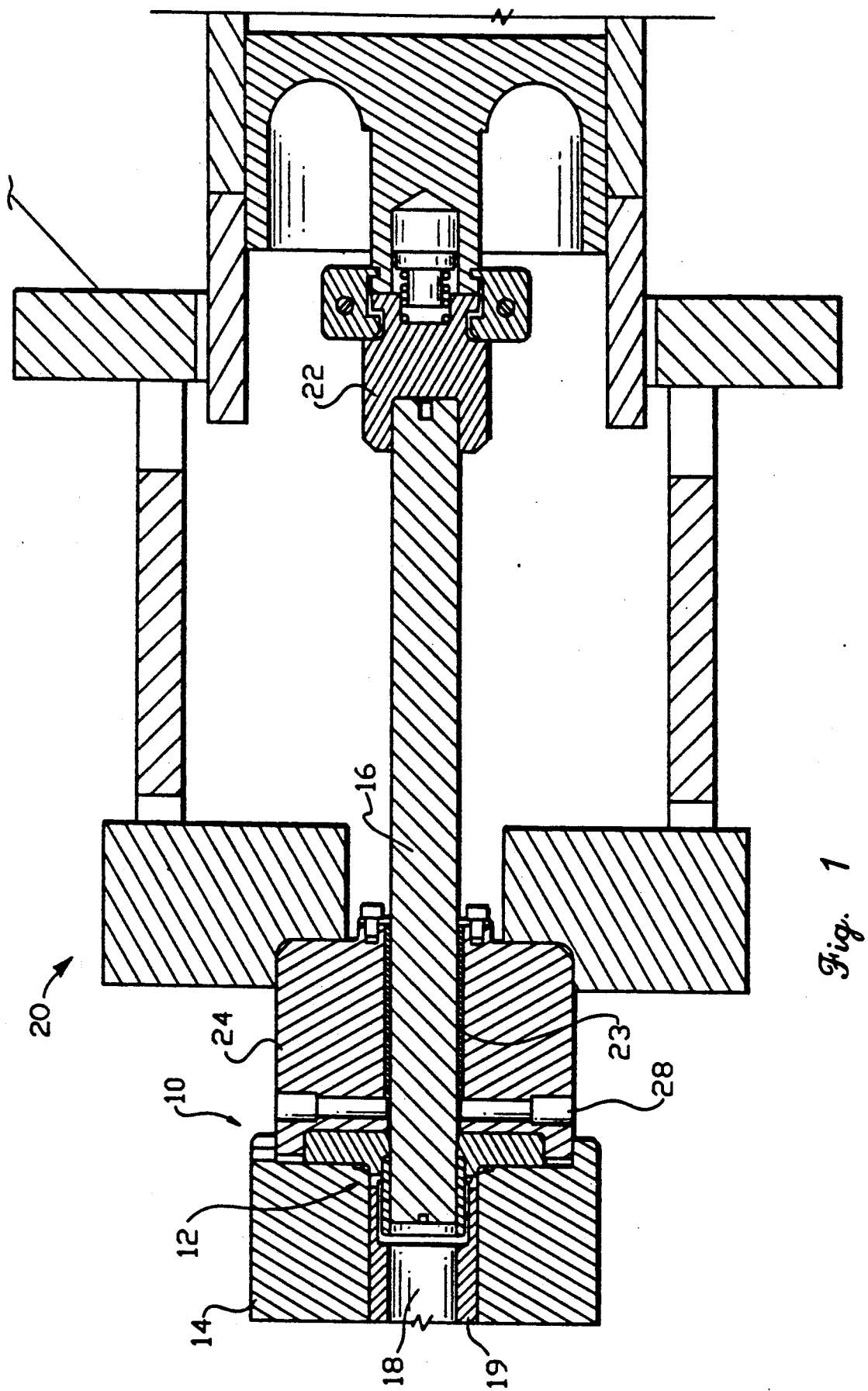
FIG. 1 is a sectional view taken along a longitudinal center axis of a high pressure pump utilizing the seal assembly of the present invention.

With reference to FIG. 1, there is shown a portion of a high pressure pump 10 incorporating the seal assembly 12 of the present invention. This pump 10 comprises a cylinder and piston assembly made up of a cylinder 14 in which a piston or plunger 16 reciprocates. At the forward end of the cylinder 14, there is a suitable valve assembly (not shown for ease of illustration) through which high pressure fluid (e.g. water) is discharged from the chamber 18 defined by the cylinder 14 during the compression stroke of the piston 16, and through which the water flows into the chamber 18 on the intake stroke of the piston 16. A filler tube 19 is positioned in the chamber 18 simply to reduce the volume of this chamber 18 in the area surrounding the piston 16.

The cylinder 14 and piston 16 assembly is mounted to a suitable housing structure 20, and the rear end of the piston 16 is connected to a suitable drive element 22. In a typical arrangement, the drive element 22 could in turn be connected to a crank shaft, the rotation of which would cause reciprocation of the piston 16. The piston 16 extends from the drive element 22 through a bearing 23 located in a guide block 24 which serves to properly position and align the piston 16, and thence through the seal assembly 12 to extend into the cylinder chamber 18. Also the guide block 24 is provided with radial passages 28 to accommodate cooling fluid and any leakage from the seal assembly 12.

Figure 2:
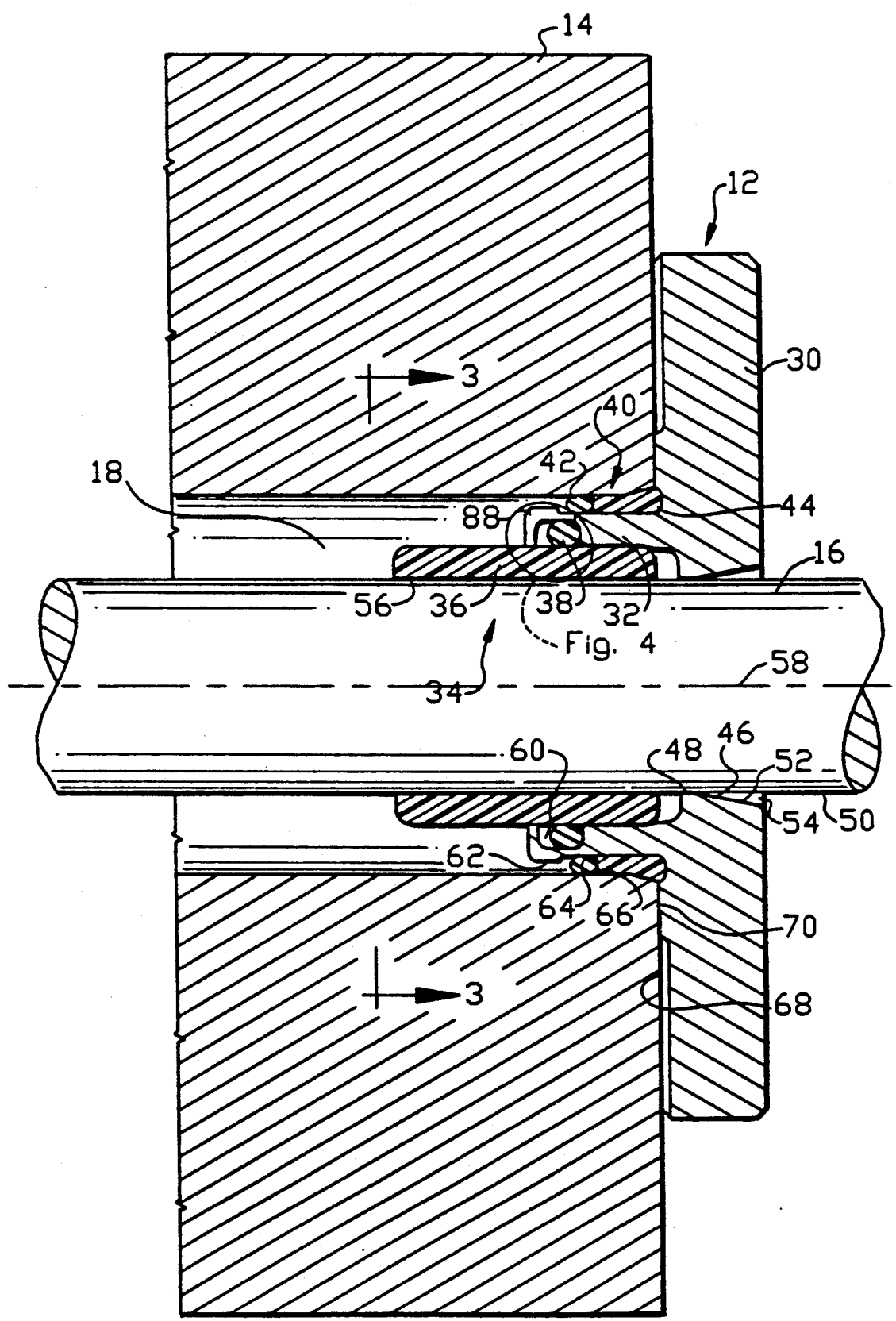
FIG. 2 is a sectional view taken along the longitudinal center axis and showing the seal assembly drawn to an enlarged scale.
Figure 3:
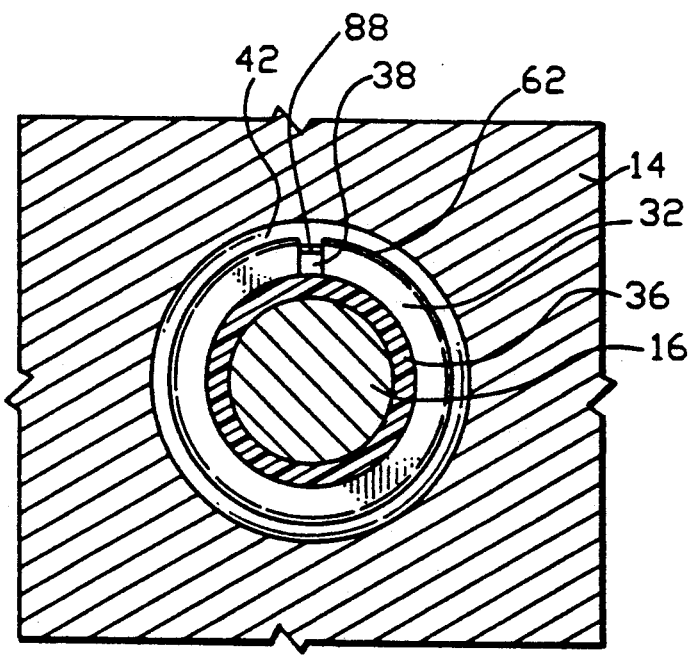
FIG. 3 is a sectional view taken along line 3—3 of FIG. 2.

With reference to FIG. 2, the seal assembly 12 of the first embodiment shown in FIGS. 1 through 4 comprises the following main components:

a. a backup ring 30 having a forwardly facing annular locating flange 32;

b. a first seal 34 comprising a seal sleeve 36 and an O-ring 38;

c. a second seal 40 comprising an O-ring 42 and a face seal member 44.

It should be noted that this same seal assembly 12 is the subject matter of one of the parent applications (Ser. No. 07/333,342), entitled "High Pressure Dynamic Seal," and being assigned to the same assignee as the present application. Other aspects of this seal assembly 12 will be covered in that other patent application. The present patent application relates particularly to the arrangement of the O-rings 38 and 42 in this seal assembly and how these are provided with pressure relief passageway means.

The present invention of this patent application resides in a recognition of certain problems associated with the action of varying high and low pressure on these O-rings 38 and 42 and how the passageway relief means (to be described hereinafter) functions with these O-rings so as to provide a proper seal, but also to alleviate operating problems with such O-rings to prevent premature deterioration of such O-rings 38 and 42, while yet permitting these O-rings 38 and 42 to accomplish their seal function.

For a proper appreciation of the present invention, before discussing specifically the arrangement of the O-rings 38 and 42 with their associated passageway relief means, there will be a general description of the overall function and operation of the seal assembly 12.

In the following detailed description, the two seal members 38 and 42, are referred to as "O-rings." However, it is to be understood that within the broader scope of the present invention, the seals 38 and 42 do not technically need to be "O-rings," but could be seals having other configurations having similar functional characteristics relative to the teachings of the present invention. For example, these seals 38 and 42 could be configured with any cross-sectional shape (e.g. round, oval, triangular, cloverleaf, square, etc.) circumferentially symmetric in a plane perpendicular to the circumferential axis. Further, these seal members 38 and 42 should be made of an elastomerical material which is deformable under load, but which is able to return to its original configuration after the deforming force is removed. Suitable materials for such seals 38 and 42 could be, for example, rubber, neoprene, urethane etc.

The backup ring 30 has a central opening 46 which comprises a forward annular surface portion 48 that has a close tolerance fit around the outer surface of the piston 16, and a rear annular surface portion 52 which expands radially outwardly in a rearward direction to provide an expanding gap 54 between the surface portion 52 and the piston surface 50. The aforementioned seal sleeve 36 has an inner annular contact surface 56 that fits around the piston surface 50. As the piston 16 reciprocates, on its forward pressure stroke, there is a very high pressure (e.g. 10,000 psi or greater) created in the chamber 18, while on the rear intake stroke, this pressure in the chamber 18 is substantially reduced. The alternating high and low pressure on the seal sleeve 36 forces the seal sleeve 36 with alternating greater and lesser force against the backup ring 30, with some extrusion of the seal sleeve 36 gradually taking place through the very small space between the surface portion 48 and the piston surface 50. (This particular arrangement and functioning of the seal sleeve 36 is explained more fully in the related application mentioned above, "High Pressure Seal Assembly," but is described briefly herein primarily to provide adequate background information for an appreciation of the inventive concepts of this present application.)

The present invention is directed primarily toward a problem associated with such pressure variations on the O-rings 38 and 42. The O-ring 38 is positioned in a radially inwardly facing annular groove 60 formed in a forward portion of the locating flange 32. This O-ring 38 cooperates with the seal sleeve 36 and the flange 32 to help provide a seal at the interface of the flange 32 and seal sleeve 36.

The other O-ring 42 is positioned around the outside surface of the positioning flange 32, and the flange 32 has a forwardly radially outwardly positioned annular shoulder 62 to position and locate the second O-ring 42. This second O-ring 42 cooperates with the aforementioned face seal member 44 to form a seal between the outer surface 64 of the flange 32 and the adjacent surface 66 of the cylinder 14. Thus, the O-ring 42 and face seal member 44 prevent passage of fluid from the chamber 18 between the adjacent forward surface portion 68 of the backup ring 30 and the rearwardly facing surface 70 of the cylinder 14. More particularly, the O-ring 42 provides sealing at low pressures, thereby activating the face seal 44 into its sealing configuration.

With the foregoing description being provided as background information, the main subject matter of the present invention will now be discussed. With this general arrangement of an O-ring seal, such as that described above, there has for some time been the problem with such O-rings (as shown at 38 and 42) of early deterioration, The cause for this deterioration has, to the best knowledge of the applicants' herein, not been clearly or adequately understood. The solution presented in the present invention is, it is believed, attributable in large part to a recognition of the mechanism which causes premature deterioration of the O-ring (such as those at 38 and 42). However, regardless of the correctness or accuracy of the recognition of this problem as it will be later described herein, it has been found that the pressure relief passageway means used in conjunction with such O-rings 38 and 42 substantially prolongs the effective operating life of these O-rings 38 and 42.

Figure 4:
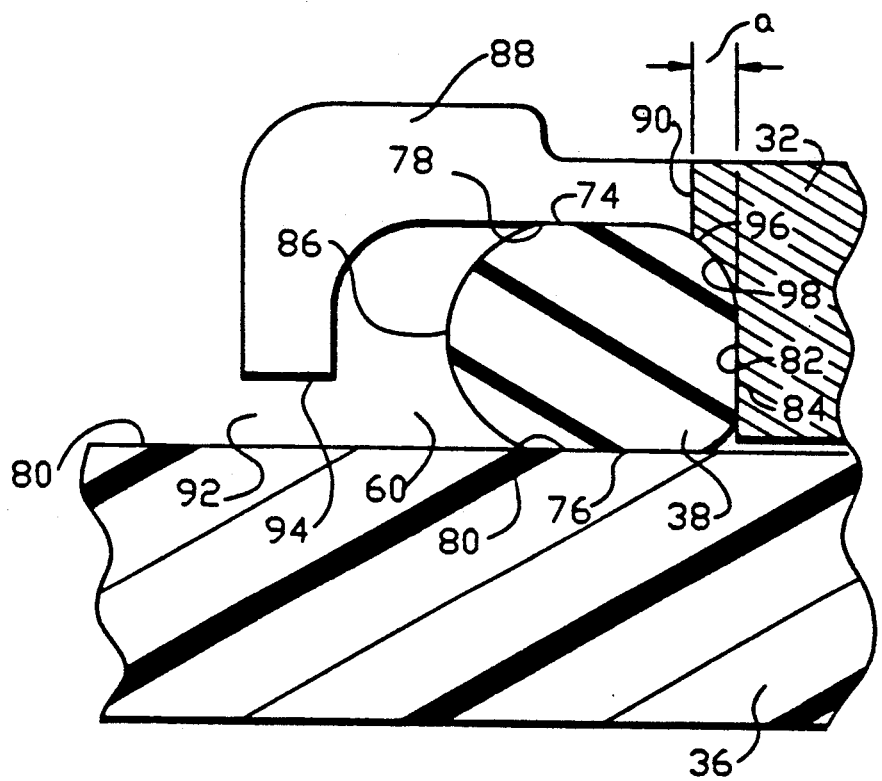
FIG. 4 is a view similar to FIG. 2, but showing a portion of the seal assembly of FIG. 2 drawn to a further enlarged scale.

To describe this further, reference is made to FIG. 4 which shows to an enlarged scale that portion of the seal assembly which is circled and designated as FIG. 4 in FIG. 2. The O-ring 38 can be considered as having two side surface portions 74 and 76, with 74 being a radially outward surface portion which fits against an inwardly facing surface 78 that partially defines the aforementioned groove 60 in which the O-ring 38 is positioned. The radially inward surface 76 of the seal 38 bears against a radially outward surface 80 of the seal sleeve 36. The flange 32 also has a forwardly facing surface portion 82 which also defines the groove 60 and which engages a back surface portion 84 of the O-ring 38. Finally, the O-ring 38 has a forward portion 86 which becomes directly exposed to the fluid pressure in the chamber 18. It will be noted that the forward portion of the flange 32 has an axially extending groove 88 which, as will be described hereinafter, provides a relief passageway for the O-ring 38. As can be seen with reference to FIG. 3, this groove or passageway 88 has a relatively small width dimension. For example, with the O-ring 38 having a diameter of about 2.5 millimeters, the cross sectional area of the groove 88 would be about between 0.1 to 0.3 square millimeters. Expressed in other terms, the width of the groove 88 would desirably be between 0.1 to 5 degrees of the full 360 degrees accurate length of the O-ring 38, and more desirably to between 1 and 2 degrees.

With reference to FIG. 4, it can be seen that the passageway 88 terminates at a rear face 90 which is located a very moderate distance forwardly of the back surface 82 of the O-ring groove 60. The significance of this will be discussed later herein. Before discussing the function of the pressure relief passageway 88, there will be a discussion of what is believed to be the mechanism which in the prior art is believed to account for what is now known to be unneeded premature deterioration of the O-ring, such as shown at 38. During the pressure stroke of the piston 16, the pressure in the chamber 18 can rise to about as high as 25,000 psi, or even up to 60,000 psi and higher. This initial rise in pressure is felt immediately at the forward surface portion 86 of the O-ring 38, and this of course compresses the O-ring 38 rearwardly so that the side surfaces 74 and 76 press radially inwardly and outwardly, respectively, so that the back surface portion 84 presses rearwardly against the adjacent surface 82. With the O-ring 38 being resiliently deformable, as the pressure in the chamber 18 increases, the pressure exerted at the surfaces 74, 76 and 84 also increase. Then, when the pressure stroke of the piston 16 is completed and the piston begins its return intake stroke, the pressure in the chamber 18 is greatly reduced and the O-ring 38 relaxes and, because of its resiliency, returns to a low pressure configuration where the pressure exerted by the surfaces 74, 76 and 84 is reduced.

The cross sectional area of the groove 88 should be such that during the pressurizing of the chamber 18 when there is an immediate rising pressure exerted upon the O-ring 38, the O-ring 38 is able to promptly activate so as to press radially inwardly and outwardly to form a proper seal at low pressures. Further, the cross-sectional area of the passageway 88 should be configured so that on the intake stroke, the passageway 88 must be sufficiently large to permit the fluid which may have accumulated behind the O-ring 38 to escape back to the area forwardly of the O-ring 38.

It should be recognized that under the very high fluid pressures existing in the chamber 18, even what is commonly thought as an incompressible fluid, such as water, does undergo some amount of compression. Further, even though the side surfaces 74 and 76 of the O-ring 38 press tightly against the adjacent side surface of the flange 32 and the seal sleeve 36, there may be some small amount of leakage which passes by these surfaces 74 and 76 and between the back O-ring surface 84 and the adjacent flange surface 2. It is surmised that on the return stroke of the piston 16 when the pressure in the chamber 18 is greatly reduced, this small amount of fluid which is adjacent to the O-ring back surface 84 does not totally flow out by the O-ring surfaces 74 and 76, but possibly expands slightly to start the growth of a fluid filled space between the O-ring back surface 84 and the adjacent flange surface 82, thus relieving the pressure in that area simply by a small amount of expansion.

On subsequent pressure strokes of the piston 16, this same phenomenon is surmised to repeat itself so that there continues to be a gradual buildup of fluid in the area between the surfaces 82 and 84. Eventually, this buildup of fluid between the surfaces 82 and 84 becomes sufficiently great so that the O-ring 38 begins to extrude into the gap 92 defined by a forward radially inward surface portion 94 of the flange 32 and the outer surface 80 of the seal sleeve 36. Thus, it is surmised that in spite of the fact the pressure in the chamber 18 is directed primarily toward the front face 86 of the seal 38 and would seem to force it to its furthermost rear position, the seal 38 in a gradual manner actually moves against this rearward thrust of the fluid pressure to gradually advance forwardly, thus hastening its own destruction.

Proceeding on the assumption that the above analysis of the dynamics of the operation of the O-ring 38 is correct, to alleviate this problem, the present invention provides the passageway 88 which is an escape route for any of the fluid which accumulates between the back surface 84 of the O-ring and the adjacent surface 82. Yet, it will be noted that the back surface 90 of the passageway 88 is spaced from the back surface 82 to provide what might be termed an intermediate adjacent surface portion 96 that still is pressed against the adjacent surface portion 98 to create sealing engagement in the area of those surfaces 96 and 98. Since the width of the passageway 88 is relatively small, in comparison with the overall circumference of the O-ring 38, the compromising of the sealing engagement of the O-ring 38 in the area of the passageway 88 does not cause the O-ring to lose its effectiveness in its seal related function.

The exact dimensioning and configuration of the relief passageway 88 relative to the O-ring 38 will vary depending upon a number of factors, for example, the shape of the O-ring 38 and its associated groove 60 in which it is positioned, the resistance of the O-ring 38 to deformation and the pressures to which it is expected to be subjected, etc.

In general, in accordance with what is presently contemplated as the preferred arrangement, the rear termination area 90 of the passageway 88 should be such that it is at least a moderate distance forwardly of the area at which the rear portion of the radially outwardly pressing face 74 terminates. Thus, there will be permitted a certain area of radially outwardly pressing sealing engagement of a rear outside portion of the O-ring 38 against an adjacent surface.

In accordance with a preferred embodiment of the present invention, with the O-ring having a nominal cross-section diameter of about 2.5 millimeters, the distance from the rear termination area 90 of the passageway 88 to the back surface 84 (the distance being indicated at "a" in FIG. 4) should be between about 0.1 to 1.0 millimeters. Expressed in percentages, the more preferred range would be that distance from this rear termination area 90 of the passageway 88 to the back surface 82 would be about between 5% to 50% of the minimum compressed diameter of the O-ring 38.

As a possible alternative configuration, it would be possible to form the groove 88 in the O-ring 38 itself, as opposed to forming this passageway in an adjoining surface or possibly provide a plurality of such venting passageways in the O-ring 38.

With reference to FIG. 2, it can be seen that the passageway 88 serves the same venting or pressure relief function with regard to the seal 42, except that the venting is provided at a location of the radially inward surface of the O-ring 42.

Figure 6:
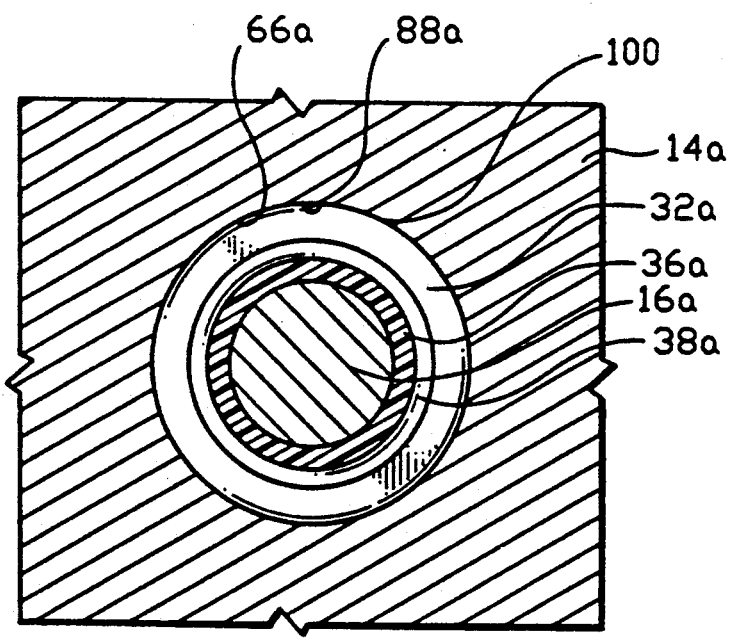
FIG. 6 is a sectional view taken along line 6—6 of FIG. 5.
Figure 5:
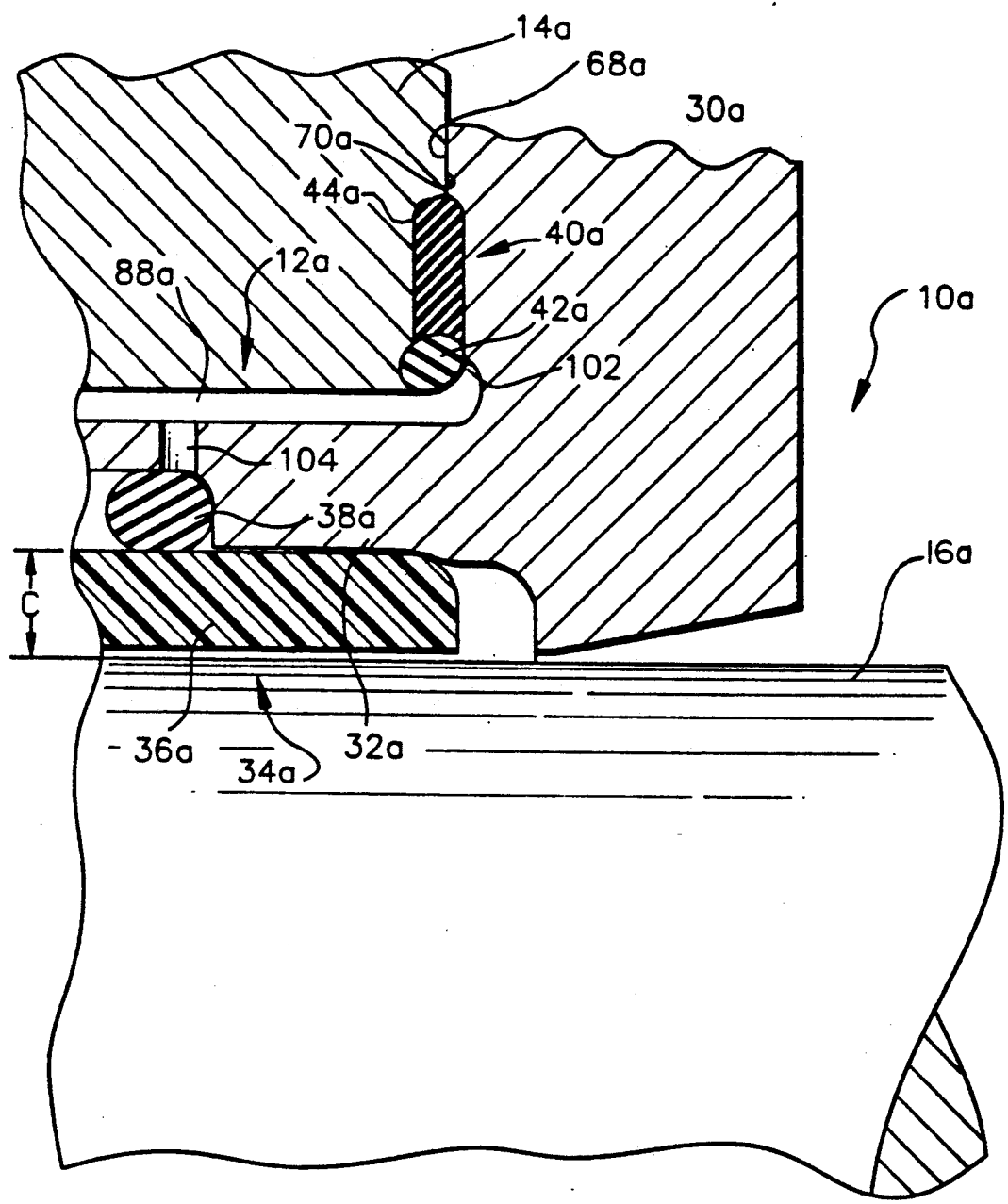
FIG. 5 is a sectional view similar to FIG. 2, but showing a second embodiment of the present invention.

A second embodiment of the present invention is shown in FIGS. 5, and 6. Components of the second embodiment which correspond to components of the first embodiment will be given like numerical designations with an "a" suffix distinguishing those of the second embodiment.

Thus, the pump 10a comprises a cylinder 14a, a piston 16a, and a seal assembly 12a. The seal assembly in turn comprises a backup ring 30a, a first seal 34a made up of the seal sleeve 36a and O-ring 38a, and a second seal 40a made up of an O-ring 42a and a face seal member 44a.

This second embodiment differs from the first embodiment in that the second seal 40a is placed at the transverse interface of the backup ring forwardly facing surface 68a, and the rearwardly facing surface 70a of the cylinder 14a. Further, the pressure relief passageway 88a is modified from the configuration of the embodiment shown in FIGS. 1 through 4.

In the arrangement of this second embodiment of FIGS. 5, and 6, the backup ring flange 32a has a radially outward cylindrical surface 100 that fits loosely against the inner cylindrical surface 66a of the cylinder 14a. The pressure relief groove 88a is formed in the flange 32a at the area of the interface of the flange surface 100 and the cylinder surface 66a. This passageway 88a extends all the way to the backup ring 30a, and upwardly a short distance at that location, as indicated at 102, so that the rear termination of the passageway 88a is at approximately the same location, relative to the O-ring 42a, as the passageway 88 is with respect to the O-ring 42 of the first embodiment.

To provide the appropriate pressure relief passageway for the O-ring 38a, there is a branch passageway 104 leading radially inwardly from outside of the flange 32a to vent the outward rear surface portion of the O-ring 38.

The mode of operation of the seal of the second embodiment of FIG. 5, and 6 is, with respect to the relief passageway aspects of preventing deterioration of the O-rings, substantially the same as in the first embodiment. Accordingly, there will be no detailed description of this phenomenon relative to the second embodiment.

It is to be recognized that various modifications can be made to the present invention without departing from the teachings thereof, and while two preferred embodiments are shown herein, obviously there could be other seal configurations incorporating the teachings of the present invention.

What is claimed is:

1. A seal assembly comprising:
  a. a high pressure structural assembly having a high pressure side which is exposed alternately to high and low pressures in a high pressure area and having two opposed groove defining side surfaces and a groove defining back surface which collectively define a seal groove, and having adjacent surfaces which extend from an area of said back surface and for which a seal is to be provided;
  b. a resilient seal member which is configured to fit in said groove and which has a high pressure surface portion facing said high pressure area, two side surface portions adapted to come into sealing engagement with the side surfaces of the structural assembly, and a back surface portion adapted to be positioned against the back surface of the structural assembly;
  c. said seal member and said structural assembly being arranged so that under a high pressure condition in said high pressure area, said seal member is pressed into a high pressure sealing configuration where each of the side surface portions presses against related side sealing surface portion of said surfaces in a related side sealing area, and where the back surface portion of the seal member is adjacent the groove defining back surface at a back seal area;
  d. said seal assembly having relief passageway means leading from at least one of the side sealing areas to said high pressure side
whereby subsequent to periods of high pressure in said high pressure area, pressure relief in said back sealed area is permitted.

2. The seal assembly as recited in claim 1, wherein said relief passageway means is formed in said structural assembly.

3. The assembly as recited in claim 2, wherein said seal member extends circumferentially 360 degrees in said seal groove, and said relief passageway means communicates directly with said seal member along a lengthwise segment of seal member, which segment extends between 0.1 to 5 degrees along the circumference of the seal member.

4. The assembly as recited in claim 3, wherein said segment is between one to two degrees of the circumference of the seal member.

5. The assembly as recited in claim 1, wherein said seal member extends circumferentially 360 degrees in said seal groove, and said relief passageway means communicates directly with said seal member along a segment of seal member, which segment extends between 0.1 to 5 degrees along the circumference of said seal member.

6. The assembly as recited in claim 5, wherein said segment is between one to two degrees of the circumference of the seal member.

7. The assembly as recited in claim 1, wherein said seal member has a nominal cross sectional diameter, said relief passageway means having a rear termination area which is spaced from the back surface of the high pressure structural assembly by a spacing distance which is between 1/20 to ½ of the nominal cross-sectional diameter.

8. The assembly as recited in claim 2, wherein said seal member has a nominal cross sectional diameter, said relief passageway means having a rear termination area which is spaced from the back surface of the high pressure structural assembly by a spacing distance which is between 1/20 to ½ of the nominal cross sectional diameter.

9. A pumping apparatus comprising:
  a. a pump assembly comprising a cylinder defining a high pressure chamber, a piston mounted for reciprocation in said cylinder along a compression stroke where high fluid pressure is created in said chamber and a return stroke where there is low pressure in said chamber, and a seal assembly to provide a seal at a region between said piston and said cylinder;
  b. said seal assembly comprising substantially stationary seal groove defining surface means, said groove defining surface means comprising two opposed groove defining side surfaces and a groove defining back surface which collectively define a seal groove,
  c. said seal assembly further comprising a resilient seal member which is configured to fit in said seal groove and which has a high pressure surface portion facing a high pressure area communicating with said chamber, two side surface portions adapted to come into sealing engagement with the groove defining side surfaces, and a back surface portion adapted to be positioned adjacent the groove defining back surface;

d. said seal member and said groove defining surface means being arranged so that under a high-pressure condition in said chamber, said seal member is pressed into a high pressure sealing configuration where the side surface portions of the seal member press against the side sealing surface portions of the groove defining side surfaces, and where the back surface portion of the seal member is adjacent the seal groove defining back surface at a back seal area;

e. said pump assembly having relief passageway means leading from at least one of said side surface portions to said chamber, whereby subsequent to periods of high pressure in said high pressure area, pressure relief in said back seal area is provided.

10. The apparatus as recited in claim 9, wherein said seal assembly further comprises a seal sleeve member positioned circumjacent said piston and said seal member engages and extends circumferentially around a radially outward circumferential surface of said seal sleeve member, with said seal sleeve member providing an inner one of said groove defining side surfaces.

11. The apparatus as recited in claim 10, wherein there is a portion of said pump assembly extending circumferentially around said seal member and providing the other of said groove defining side surfaces.

12. The apparatus as recited in claim 11, wherein said portion of the pump assembly provides said groove defining back surface, and also provides said relief passageway means which extends axially to communicate with said chamber.

13. The apparatus as recited in claim 10, wherein said seal assembly further comprises a backup ring which has a flange portion which extends over at least a portion of said seal sleeve member to extend circumferentially around said seal member, provides a radially outwardly positioned one of said groove defining side surfaces, and also has formed therein said relief passageway means.

14. The apparatus as recited in claim 9, wherein said seal assembly further comprises a backup ring which has a flange portion which extends circumferentially around said seal member, provides a radially outwardly positioned groove defining side surface, and also has formed therein said relief passageway means.

15. The apparatus as recited in claim 9, wherein said seal assembly further comprises a backup ring which is positioned against said cylinder, and said backup ring and said cylinder provide said groove defining surface means, with said cylinder providing one of said groove defining side surfaces and said backup ring providing the other of said groove defining side surfaces.

16. The apparatus as recited in claim 9, wherein a. said seal assembly further comprises a seal sleeve member positioned circumjacent said piston and said seal member engages and extends circumferentially around a radially outward circumferential surface of said seal sleeve member, with said seal sleeve member providing an inner one of said groove defining side surfaces;

b. said seal assembly further comprises a backup ring which has a flange portion which extends over at least a portion of said seal sleeve member to extend circumferentially around said seal member, provides a radially outwardly positioned groove defining side surface, and also has formed therein said relief passageway means;

c. said seal assembly comprises a backup ring which is positioned against said cylinder, and said backup ring and said cylinder provide a second groove defining surface means, with said cylinder providing one of two second groove defining side surfaces and said backup ring providing the other of said second groove defining side surfaces with said second groove defining side surfaces comprising said second groove defining surface means; and d. a second resilient seal member positioned in said second groove defining surface means.

e. said relief passageway means leading from at least one of said two second groove defining side surface means.

17. The apparatus as recited in claim 16, wherein the flange portion of said back-up ring provides said other of the second groove defining side surfaces.

* * * * *